United States Patent [19]

Weber

[11] 3,830,509

[45] Aug. 20, 1974

[54] HYDRAULICALLY CONTROLLED HOLDING DEVICE

[75] Inventor: Jonathan T. Weber, Cincinnati, Ohio

[73] Assignee: Positrol, Inc., Cincinnati, Ohio

[22] Filed: July 14, 1972

[21] Appl. No.: 271,908

[52] U.S. Cl............... 279/2, 242/72 R, 269/48.1, 279/4
[51] Int. Cl............................................ B23b 31/40
[58] Field of Search............ 279/4, 2, 1 ME; 82/44; 269/48.1; 242/72 R, 72 B

[56] References Cited
UNITED STATES PATENTS

| | | | |
|---|---|---|---|
| 3,076,662 | 2/1963 | Kostyrka | 279/1 ME |
| 3,251,604 | 5/1966 | Better | 279/4 |
| 3,370,842 | 2/1968 | Sykes | 279/2 X |
| 3,507,507 | 4/1970 | Tobler et al. | 279/4 X |
| 3,516,681 | 6/1970 | Cox et al. | 279/4 |

Primary Examiner—Andrew R. Juhasz
Assistant Examiner—Z. R. Bilinsky
Attorney, Agent, or Firm—John W. Melville; Albert E. Strasser; Stanley H. Foster

[57] ABSTRACT

A hydraulically controlled holding device for accurately locating and securing locking tools or workpieces in position during the performance of various manufacturing and testing operations. The holding device may be in the form of an arbor or a chuck and comprises a body having a closed hydraulic system therein and a thin-walled sleeve adapted to be pressurized into contact with the tool or workpiece by the application of hydraulic pressure thereon from the closed system. The holding device is characterized by the fact that the thin-walled sleeve is constantly pressurized, in the presence or absence of a tool or workpiece, and requires the action of an outside agency or force to relieve the pressure on the thin-walled sleeve. The holding device may also be provided with indicator means to show whether or not the thin-walled sleeve is properly and adequately pressurized.

3 Claims, 11 Drawing Figures

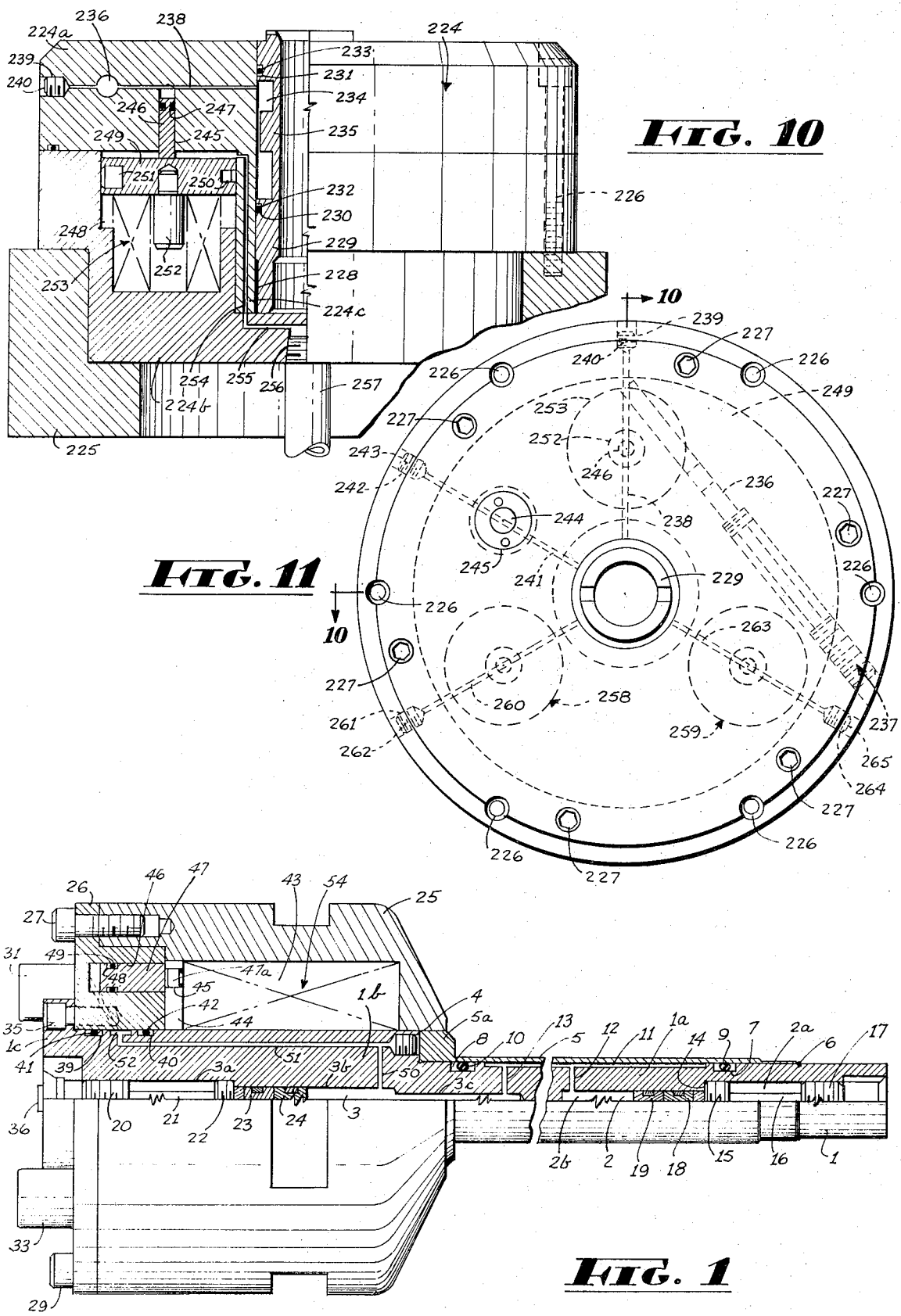

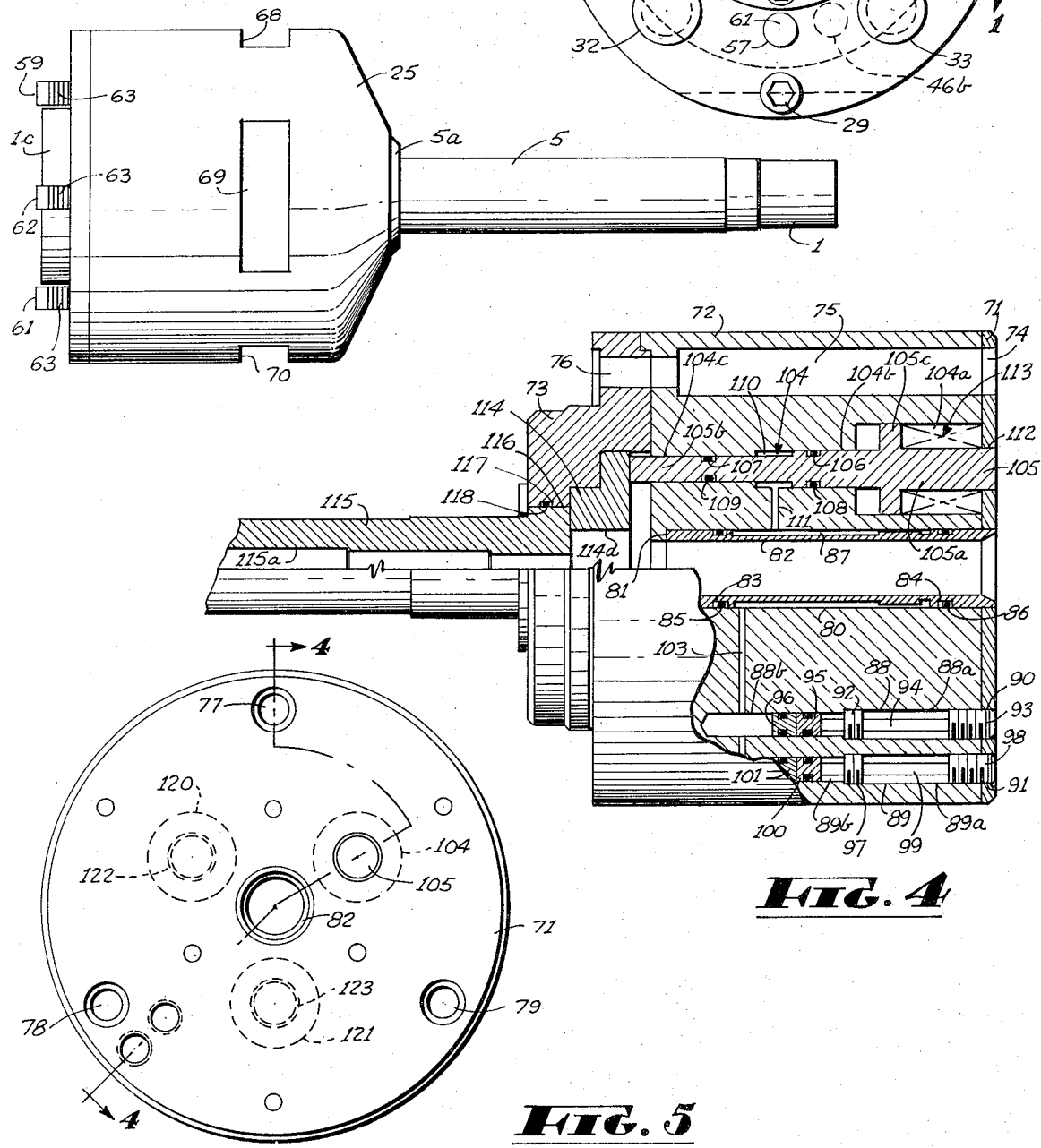

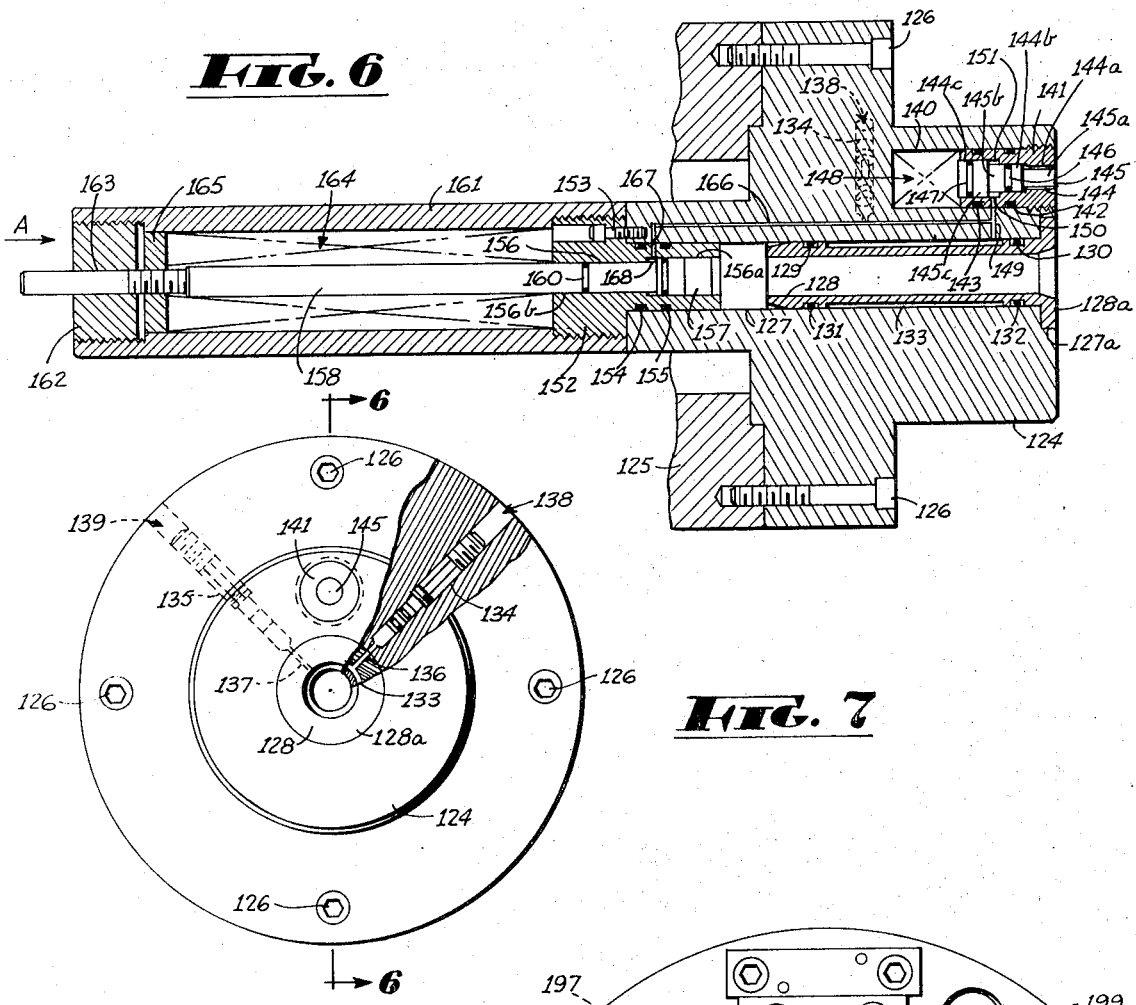
FIG. 6
FIG. 7
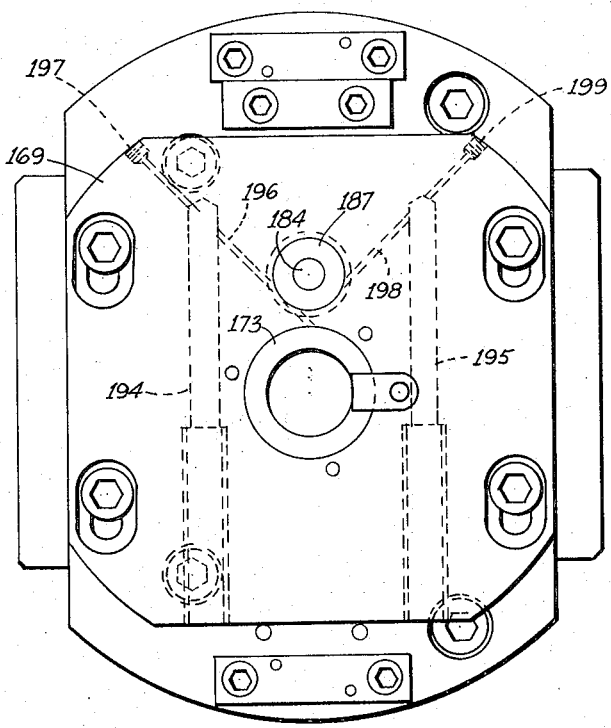
FIG. 9

HYDRAULICALLY CONTROLLED HOLDING DEVICE

BACKGROUND OF THE INVENTION

1. Field of the Invention

The invention relates to a hydraulically actuated holding device in the form of an arbor or chuck having a closed hydraulic system therein pressurizing a thin-walled sleeve into contact with a tool or workpiece, and more particularly to such a holding device wherein the thin-walled sleeve is constantly pressurized until the pressure is relieved through the action of an outside agency or force.

2. Description of the Prior Art

Prior art workers have developed a number of different types of hydraulically actuated chucks and arbors. For example, chucks and arbors have been provided with elongated, thin-walled, cylindrical sleeves capable of being distorted to provide a uniform clamping action on a tool or workpiece. Such chucks or arbors are frequently provided, within their bodies, with closed hydraulic systems providing hydraulic pressure by which the thin-walled sleeves are distorted into their clamping positions. U.S. Pat. No. 2,963,298 teaches an exemplary structure. Furthermore, U.S. Pat. No. 3,516,681 teaches such chucks or arbors provided with a pressure indicating means in the form of a plunger or stem. When sufficient pressure is applied to the thin-walled sleeve of the chuck or arbor, the plunger or stem will extend outwardly and visibly from the chuck or arbor body. The last mentioned patent additionally teaches that the stem or plunger may be painted or otherwise marked so that the operator may more readily detect the presence or absence of adequate pressure within the closed hydraulic system.

Such prior art structures (with or without indicating means), however, are characterized by the fact that they require manual adjustment to achieve proper holding pressure by the thin-walled sleeve each time a tool or workpiece is inserted in the holding device. Furthermore, this setting or adjustment is lost each time the tool or workpiece is released from the holding device. This, in turn, precludes a high production rate or rapid testing operations with such holding devices.

The present invention provides chucks or arbors having thin-walled sleeves which are constantly pressurized unless acted upon by an outside agency or force. The releasing force may be mechanical, hydraulic, compressed air or the like.

In the use of the holding device of the present invention, it is only necessary to apply the outside force to the holding device; insert the workpiece or tool therein; and then release the outside force. Once the outside force is released, the tool or workpiece is held by the thin-walled sleeve with the proper holding force or pressure. The holding devices therefore lend themselves well to rapid testing operations and high production rate manufacturing operations.

In use, the holding devices of the present invention need be manually adjusted to achieve the proper pressurization of the thin-walled sleeve only at the time of first use. Thereafter additional adjustments need be made only if leakage of the hydraulic fluid occurs in the closed hydraulic system. Indicator means may be provided for the holding devices so that the operator may be assured at a glance that they are maintaining their proper pressure or holding force.

SUMMARY OF THE INVENTION

The holding device of the present invention, which may be in the form of a chuck or an arbor, is characterized by a body provided with a thin-walled sleeve. The body has a closed hydraulic system therein a communication with the sleeve and adapted to apply pressure to the sleeve to distort it so that it will provide a uniform clamping action on a tool or workpiece. In accordance with the present invention, the thin-walled sleeve is constantly pressurized to its holding position, in the presence or absence of a tool or workpiece, until acted upon by an outside agency or force releasing the pressure on the sleeve. Indicator means may be provided to assure the operator that the sleeve is properly and sufficiently pressurized.

In one embodiment, the holding device is provided with indicator pins which extend outwardly of the body of the holding device when the sleeve is properly pressurized. Pressure may be released from the sleeve by means of a tool which grasps the body of the holding device and depresses the indicator pins.

In a second embodiment, the holding device is provided with one or more indicator pins which are flush with the body of the holding device when the device is properly pressurized. The pressure may be released from the sleeve by a simple pushing action on the one or more indicator pins to positions wherein they extend outwardly of the holding device body.

In another embodiment, a piston means is provided which, if acted upon by pushing force, releases the pressure from the sleeve. In yet another embodiment, release of pressure is accomplished by an air cylinder.

In a final embodiment, release is again accomplished by compressed air, but the holding device is completely selfcontained, including within its body the thin-walled sleeve, pressure indicator means, a closed hydraulic system and the pressure release means. With this last mentioned embodiment, it is only necessary to connect the holding device to a source of compressed air.

BRIEF DESCRIPTION OF THE DRAWINGS

FIG. 1 is a side elevational view, partly in cross section (taken along section lines 1—1 of FIG. 2) of one embodiment of the holding device of the present invention.

FIG. 2 is an end elevational view of the embodiment of FIG. 1, as seen from the left in FIG. 1.

FIG. 3 is a side elevational view of the embodiment of FIG. 1.

FIG. 4 is a fragmentary side view, partly in cross section (taken along the section line 4—4 of FIG. 5) of another embodiment of the holding device of the present invention.

FIG. 5 is an end elevational view of the embodiment of FIG. 4, as seen from the right in FIG. 4.

FIG. 6 is a fragmentary cross sectional view of another embodiment of the holding device of the present invention taken along section line 6—6 of FIG. 7.

FIG. 7 is an end elevational view, partly in cross section, of the embodiment of FIG. 6 as seen from the right of that figure.

FIG. 9 is a front elevational view of the embodiment of FIG. 8 as seen from the right in that figure.

FIG. 10 is a fragmentary side elevational view, partly in cross section, (taken along the section line 10—10 of FIG. 11) and illustrating a self-contained embodiment of the present invention.

FIG. 11 is a front elevational view of the holding device of FIG. 10 as seen from the top of that figure.

DESCRIPTION OF THE PREFERRED EMBODIMENTS

Figure 8:
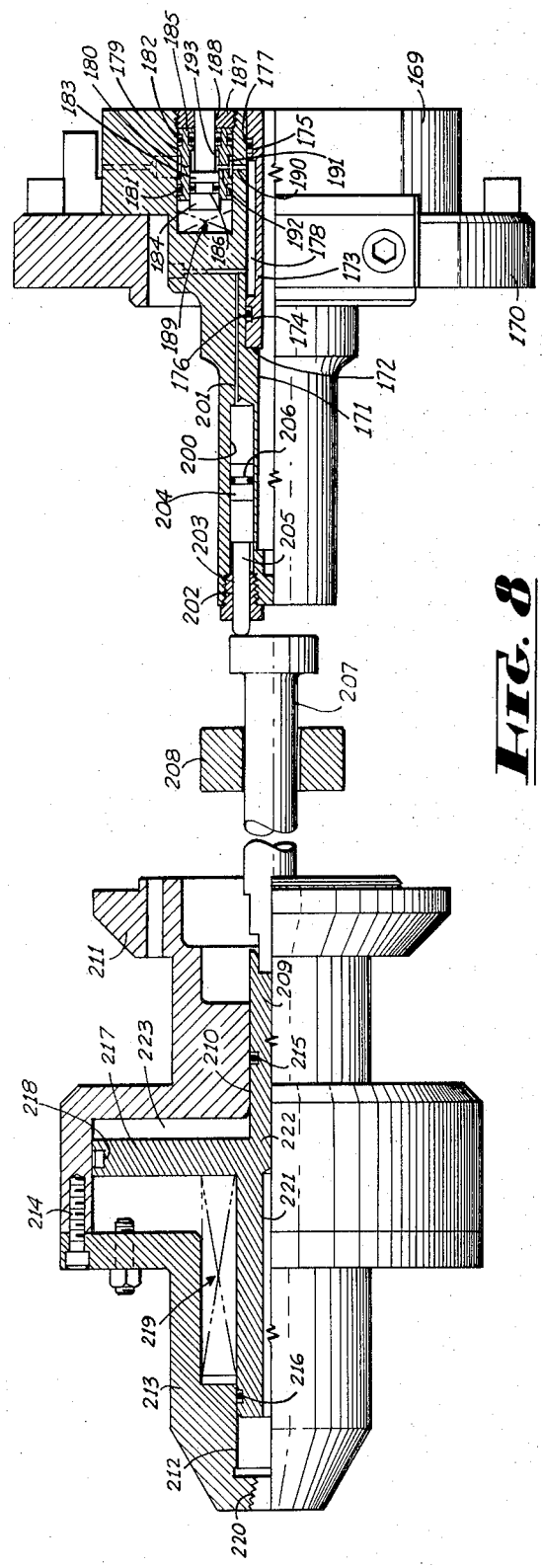
FIG. 8 is a side elevational view, partly in cross section, of an embodiment similar to that of FIG. 6 and provided with air cylinder means to depressurize the thin-walled sleeve.

A simple embodiment of the present invention is illustrated in FIGS. 1 through 3, wherein like parts have been given like index numerals. The holding device of FIGS. 1 through 3 is in the form of an arbor. The arbor comprises a body 1 having an axial bore 2 extending from its forward end and an axial bore 3 extending from its rearward end. The body 1 has a forward portion 1a and a rearward portion 1b. The rearward portion is of greater diameter than the forward portion, forming a shoulder 4 therebetween.

A cylindrical thin-walled sleeve 5 is mounted on the forward portion 1a of the body. The sleeve 5 has an enlarged rearward end 5a adapted to abut the body shoulder 4. The sleeve is maintained in position on the body portion 1a by means of a retaining ring 6 mounted in a shallow groove in the body portion 1a.

The forward portion 1a of the body 1 has a pair of spaced annular grooves 7 and 8 adapted to receive O-rings 9 and 10 respectively. In this manner, the ends of the sleeve 5 are sealed with respect to the body portion 1a. The body portion 1a also has a large annular groove or depression 11 underlying the major portion of the sleeve 5 and extending from a position adjacent the groove 7 to a position adjacent the groove 8. The annular depression 11 is connected to the axial body bores 2 and 3 by passages 12 and 13 respectively. The bores 2 and 3, connecting passages 12 and 13 and the annular depression 11 constitute the closed hydraulic system of the holding device and are adapted to receive hydraulic fluid. It will be understood that hydraulic fluid under pressure in the annular depression 11 will cause distortion of the thin-walled sleeve 5 into engaging contact with a tool or workpiece (not shown) mounted on the sleeve.

It will be noted that the bore 2 in the forward portion 1a of the body has a first part 2a and a second portion 2b of lesser diameter with a shoulder 14 therebetween. The bore 2 may be provided with actuator means by which pressure is applied to the hydraulic fluid in the sealed system. The actuator means comprises a jam screw 15 threadedly engaged in the larger diameter portion 2a of the bore 2 and seated against the shoulder 14. The jam screw 15 has a central perforation adapted to slidingly receive the shaft 16 of an actuator screw 17.

The actuator screw 17 is also threadedly engaged in the larger diameter portion 2a of bore 2. Rotation of the actuator screw 17 in one direction will cause its shaft 16 to move into the smaller portion 2b of the bore 2 through the perforation in the jam screw 15. Rotation of the actuator screw 17 in the opposite direction will cause movement of the shaft 16 in the opposite direction.

The smaller diameter portion 2b of the bore 2 is provided with a first piston 18 having an annular notch containing an O-ring and a second piston 19, also have an annular notch containing an O-ring. While it would be within the scope of the invention to provide a single piston, it is preferred to provide the pair of pistons 18 and 19. The piston 18 may be made of brass or like material of excellent wear characteristics and the piston 19 may be made of Teflon or similar material noted for its sealing characteristics.

The actuator screw 17 may be provided wih a slot or other means (not shown) engageable by an appropriate tool. It will be understood that when the actuator screw 17 is turned in such a way as to cause pistons 18 and 19 to move toward the left in FIG. 1, the pressure of the hydraulic fluid in the closed system will be increased.

The bore 3 has three portions 3a, 3b and 3c. The diameter of the bore portion 3c is less than that of portion 3b and the diameter portion 3b is less than that of portion 3a. The bore portion 3a is internally threaded. The bore 3 may be provided with a second actuator means substantially identical to that described with respect to bore 2. Therefore, bore portion 3a is illustrated as having an actuator screw 20 with a shaft 21 and a jam screw 22 equivalent to the actuator screw 17, shaft 16 and jam screw 15 of bore 2. The bore portion 3b may contain a pair of pistons 23 and 24 equivalent to pistons 18 and 19, respectively, in bore 2.

The actuator means in the bore 3 functions in the same manner as that described with respect to the actuator means in bore 2. It would be within the scope of the invention to eliminate one of these actuator means and replace it simply with a plug or the like. However, the provision of two or more actuator means provides a greater range of pressure adjustment in the closed hydraulic system.

The portion 1b of the arbor body 1 is surrounded by a housing 25 and a cover 26 for the housing. The cover 26 is affixed to the housing by a series of cap screws 27 through 30. The cover 26 may have a series of drive pins 31 through 34 which are engaged by the fixture or spindle (not shown) to which the arbor is affixed, the drive pins being the means by which rotational motion is imparted to the arbor.

The rearwardmost end of the portion 1b of the arbor body 1 has an annular flange 1c. Appropriate coaxial perforations are provided in the flange 1c and the cover 26 so that the arbor body may be affixed to the cover by a series of cap screws 35 through 38. The body portion 1b of the arbor body has a pair of spaced annular grooves 39 and 40 containing O-rings 41 and 42, respectively. Therefore, the body portion 1b of the arbor is sealed with respect to the cover 26.

As indicated above, the housing 25 is hollow and it and the cover 26 form an annular chamber 43 about the portion 1b of the arbor body. An annular ring 44 is slidably mounted on the arbor portion 1b within the chamber 43. Referring particularly to FIG. 1 it will be noted that the ring 44 has a perforation 45 therethrough. The cap 26 has a bore 46 coaxial with the perforation 45. A piston 47 is slidably mounted in the bore 46 and has an end portion 47a slidably mounted in the perforation 45 in the annular disc 44. The piston 47 has an annular notch 48 therein containing an O-ring 49 so that the portion is sealed with respect to the wall of bore 46.

The bore portion 3b of the axial bore 3 in the arbor body is connected by passages 50 and 51 to an annular notch 52 in the outside surface of the arbor body portion 1b between the annular notches 39 and 40. An additional passage 53 communicates between the annular notch 52 and the bore 46 in the cover. Thus, through passages 50 and 51, annular notch 52 and passage 53, the bore 46 is connected to the sealed hydraulic system of the arbor body.

Reference is made to FIG. 2 wherein the bore 46 in the cover 26 is shown in dotted lines. It will further be noted in FIG. 2 that there are two more bores in the cap 26 equivalent to bore 46 and indicated in dotted lines at 46a and 46b. It will be understood that each of the bores 46a and 46b will have piston means equivalent to piston 47 floatingly mounted in perforations in the annular ring 44. Similarly, each of the bores 46a and 46b will be provided with passages equivalent to passage 53 connecting them with the annular notch 52 in the exterior surface of the portion 1b of the arbor body, therefore connecting them to the closed hydraulic system of the arbor body.

From the structure thus far described, it will be evident that when the hydraulic fluid in the closed system of the arbor body is pressurized by one or both actuator screws 17 and 20 and their associated actuator mechanism, hydraulic fluid in bores 46, 46a and 46b will similarly be pressurized and will act upon the piston 47 in bore 46 and the pistons (not shown) in the bores 46a and 46b tending to move in the annular ring 44 in the housing chamber 43 forwardly as seen in FIG. 1. The chamber 43 will contain a plurality of springs generally at 54 tending to retard forward movement of the annular ring 44. The nature of the springs 54 does not constitute a limitation on the present invention. For example, they may comprise a plurality of Belville springs surrounding the portion 1b of the arbor body or they may be a plurality of coil springs located about the portion 1b of the arbor body within the chamber 43.

Returning to FIG. 2, it will be noted that the cover 26 has an additional series of bores 55 through 58 extending therethrough. The bores 55 through 58 are evenly spaced about the cover 26. Slidably mounted in each of the bores 55 through 58 there are indicator pins 59 through 62, respectively. One end of each indicator pin extends outwardly from the cover 26. This is shown in FIG. 3 wherein like parts have been given like index numerals. It will be noted that for purposes of clarity, cap screws 27 through 30 and 35 through 38 together with drive pins 31 through 34 have been eliminated from FIG. 3. The other ends of the indicator pins 59 through 62 (not shown) are appropriately affixed to the annular ring 44 in the housing chamber 43. The manner in which they are affixed does not constitute a limitation on the present invention. For example, they may be threadedly engaged in perforations in the annular ring 44.

It will be understood that as the closed hydraulic system within the arbor body 1 is pressurized and the pistons in the cover bores 46, 46a and 46b cause the annular ring 44 to move forwardly within the housing chamber 43 against the action of springs 54, the indicator pins 59 through 62 will shift with the annular ring 44 so that the length of the indicator pins extending beyond the cover 26 is indicative of the amount of pressure within the closed hydraulic system. It will be understood that the spring 54 within the housing chamber 43 must be carefully chosen so that the indicator pins 59 through 62 will accurately indicate the pressure within the closed hydraulic system. To facilitate this indication of pressure, the indicator pins 59 through 62 may be provided with annular scribe lines, color bands or the like, as indicated at 63 in FIG. 3.

To complete the arbor of FIGS. 1 through 3, it is only necessary to provide a fill port for hydraulic fluid whereby the hydraulic fluid may be conveniently introduced into the closed system. This fill port may be located at any convenient place within the structure. In FIG. 2 such a fill port is shown in the cap 26 at 64. The port 64 is threaded so as to receive a removable plug 65. The housing 25 has a perforation 66 in its side to permit access to the fill port 64. Finally, the fill port 64 is connected by a passage 67 to any convenient part of the closed hydraulic system, as for example to the annular notch 52 in the exterior surface of the portion 1b of the arbor body.

The use of the structure of FIGS. 1 through 3 may be described as follows. Once the arbor is assembled, the closed hydraulic system is filled with hydraulic fluid through the fill port 64. The fill port is then closed by means of plug 65. Thereafter, one or both actuator screws 17 and 20 are turned by the operator until the closed hydraulic system (and therefore the thin walled sleeve 5) is appropriately pressurized, as shown by indicator pins 59 through 62. Once these initial adjustments are made, the arbor will remain properly pressurized from that point onward. No further adjustments need be made in the arbor unless and until, through usage, some of the hydraulic fluid in the closed system is lost through leakage. If such leakage should occur, it can be readily ascertained by rapid inspection of the indicator pins 59 through 62. This is true because if too little pressure exists in the closed hydraulic system, the indicator pins will extend further beyond the cover 26 than they would if the pressure were proper.

In order to insert a tool or workpiece on the thin-walled sleeve of the arbor, it is necessary that the sleeve be depressurized. This is readily accomplished by depressing the indicator pins 59 through 62. If the indicator pins 59 through 62 are depressed by an appropriate tool, it will be evident that they will remove the annular ring 44 forwardly in the housing chamber 43 against the action of springs 54. As a consequence, the piston 47 within the bore 46 and the similar pistons (not shown) within the bores 46a and 46b will be free to move forwardly with the annular ring 44 relieving the pressure in the bores 46, 46a and 46b. This, in turn, will relieve the pressure in the entire closed hydraulic system and will enable the positioning of a workpiece or tool on the thin-walled sleeve 5 of the arbor. Once the tool or workpiece is in position on the sleeve 5, the indicator pins 57 through 62 will be released and will be returned to their proper position by the action of springs 54 on the annular ring 44. The piston 47 in bore 46 and the other similar pistons in bores 46a and 46b will be returned to their proper position and the hydraulic fluid within the closed system will return to its proper pressurization. In turn, the thin-walled sleeve 5 will engage the workpiece or tool with its proper holding or locking force.

From the above description it will be evident that the removal of the workpiece or tool from sleeve 5 will be accomplished in the same manner, i.e., simply by depressing indicator pins 59 through 62. Thus, it will be further evident that the gripping of or releasing of workpieces or tools by the arbor can be accomplished rapidly and efficiently without any pressure adjustment required in the closed hydraulic system. Thus, in this embodiment, the indicator pins not only serve as release means by which tools or workpieces can be inserted on or removed from the sleeve 5, but also serve as a constant indication to the operator that the tool or workpiece is being properly engaged by the sleeve 5.

The nature of the tool used to depress the indicator pins 59 through 62 does not constitute a limitation on the present invention. It may be a clamping device capable of engaging the housing 25 and the indicator pins. To this end, the housing 25 may be provided with a plurality of external depressions evenly spaced thereabout, enabling the engagement of the housing by the tool. Three such depressions are shown at 68 through 70 in FIG. 3.

Another embodiment of the invention is illustrated in FIGS. 4 and 5. In this instance, the invention is shown in its application in a chuck. The chuck comprises a forward cap 71, a body 72 and an adapter 73. These members are held together by a series of cap screws passing through aligned perforations in these elements. One such group of aligned perforations are shown at 74, 75 and 76 in FIG. 4, and the cap screws themselves are shown at 77, 78 and 79 in FIG. 5.

The body 72 has an axial bore 80 therein terminating at the rear of the body in a portion of less diameter to form a shoulder 81. A thin-walled sleeve 82 is located in the axial bore 80 and seats against the shoulder 81. Near either end, the sleeve 82 has annular notches 83 and 84 carrying O-rings 85 and 86 by which the sleeve is in sealed engagement with the surface of the axial bore 80. In addition, the sleeve 82 has a central, elongated depression 87, constituting a part of the sealed hydraulic system, as will be evident hereinafter.

The body 72 has a pair of longitudinally extending bores 88 and 89. The bore 88 has a first portion 88a of large diameter and a second portion 88b of lesser diameter. Similarly, the bore 89 has a portion of large diameter 89a and a portion of lesser diameter 89b. The forward cap 71 has a pair of perforations 90 and 91 coaxial with the bores 88 and 89, respectively.

The bores 88 and 89 are adapted to contain actuator means substantially identical to those described with respect to the embodiment of FIGS. 1 through 3. Thus, bore 88 contains a jam screw 92 with a central perforation therein and an actuator screw 93 with an axially extending shank 94 passing through the perforation in the jam screw 92. The portion 88b of the bore 88 contains a pair of pistons 95 and 96, each having O-rings. The piston 95 may be made of brass and the piston 96 may be made of Teflon. Similarly, the bore 89 contains a perforated jam screw 97, an actuator screw 98 with an axially extending shank 99, a brass piston 100 and a Teflon piston 101.

The body 72 of the chuck contains a radially extending passage 103 which communicates with the bores 88 and 89 and the annular depression 87 in the thin-walled sleeve 82. The structure thus far described constitutes the primary portion of the closed hydraulic system, it being evident tha when fluid in the hydraulic system is pressurized by adjustment of one or both of actuator screws 93 and 98, fluid in the annular depression 87 about the sleeve 82 will cause distortion of the sleeve into its pressurized and tool or workpiece-gripping configuration.

The body 72 of the chuck has an additional longitudinal bore therein generally indicated at 104. The first portion of the bore is of large diameter as at 104a, the second portion of the bore being of lesser diameter as at 104b and a third portion of the bore 104c being of even less diameter. Located within the bore 104 there is an indicator pin 105. The indicator pin 105 is of somewhat greater length than the body 72 and has a first portion 105a of a diameter such as to be slidingly received in the portion 104b of the bore 104. The indicator pin 105 has a second portion 105b of a diameter such as to be slidingly received in the position 104c of the bore 104. Both portions 105a and 105b of the indicator pin have annular notches 106 and 107, respectively, containing O-rings 108 and 109, respectively. Therefore, the indicator pin is sealed with respect to the portions 104b and 104c of the bore 104.

The diameter difference in portions 105a and 105b of the indicator pin form an annular chamber 110 in the rearward part of portion 104b of bore 104. A passage 111 is provided in the chuck body 72 communicating between the annular chamber 110 and the annular depression 87 in the thin-walled sleeve 82. It will therefore be evident that when hydraulic fluid in the annular depression 87 of sleeve 82 is pressurized, hydraulic fluid under pressure will also exist in the annular chamber 110 tending to move the indicator pin 105 forwardly of the chuck body (i.e., to the right in FIG. 4). The forward cap 71 has a perforation 112 therein to slidingly receive the forwardmost end of the indicator pin 105. The portions 105a of indicator pin 105 has an annular flange 105c thereon having a diameter substantially equal to the diameter of portion 104a of bore 104. Between the cap 71 and the annular flange 105c on the indicator pin there are located spring means generally indicated at 113. Again the spring means may be of any suitable type including a plurality of coil springs, Belville springs or the like. These springs 113 should be carefully chosen so that the indicator pin 105 will properly indicate the presence of adequate pressure within the hydraulic system and therefore adequate pressurization of the thin-walled sleeve 82. While proper pressurization may be indicated by a forwardmost portion of indicator pin 105 extending outwardly of the forward cap 71, in the particular embodiment illustrated proper pressurization is indicated by the fact that the forwardmost end of indicator pin 105 is flush with the exterior surface of forward cap 71. Should indicator pin 105 be depressed inwardly with respect to perforation 112 in the forward cap 71, this is an indication that adequate pressure is not present in the system and adjustments should be made by means of actuator screws 93 and 98.

As thus far described, it will be evident that once an initial adjustment is made by means of one or both of actuator screws 93 and 98, the sleeve will be constantly pressurized, in the presence or absence of a tool or workpiece therein. The presence of proper pressurization can be constantly and readily ascertained by the operator simply by determining the position of indicator pin 105.

In order to insert or remove a tool or workpiece from sleeve 82, it is necessary to relieve the hydraulic pressure in the closed system. This is accomplished by moving the indicator pin 105 forwardly within the body 72 thereby increasing the volume of chamber 110. This action decreases the pressure of the hydraulic fluid within the system. To accomplish such movement of indicator pin 105 against the action of spring means 113 an annular disc-like pusher 114 is located within the adapter 73, its forward face contacting the rearward end of indicator pin 105. Finally, an additional member 115 is slidably mounted in a central perforation 116 in the rearward portion of adapter 73. The perforation 116 may contain an annular notch 117 and an O-ring 118 so that the member 115 is sealed in the perforation 116 to prevent the passage of dirt and the like therethrough. The rearwardmost position of the member 115 is determined (as shown) by a rearward cap 119 fixed to the rear surface of adapter 73 by any suitable means such as cap screws or the like (not shown). It will be evident from FIG. 4 that if a force is imparted to the member 115 to move it forwardly with respect to the chuck (i.e., to the right in FIG. 4) it will, in turn, move pusher 114 in the same direction. Such movement of pusher 114 will, in turn, move the indicator pin 105 forwardly thereby relieving the pressure in the closed hydraulic system. Once a tool or workpiece has been inserted in or removed from sleeve 82, and force has been removed from the member 115, the spring means 113 will move the indicator pin, the pusher 114 and the member 115 to their normal positions and the hydraulic system (and therefore the sleeve 82) will be properly pressurized. The force acting upon member 115 may be of any suitable type including mechanical, hydraulic, compressed air of the like.

The embodiment of FIGS. 4 and 5 may be provided with more than one indicator pin 105. To this end, bores equivalent to bore 104 are indicated in dotted lines at 120 and 121. It will be understood that these bores will be connected to the annular depression 87 in the sleeve by passages equivalent to the passage 111. The bores will contain pins 122 and 123, respectively, equivalent to the indicator pin 105 and their operation will be identical. Furthermore, the rearward ends of indicator pins 122 and 123 will be contacted by pusher 114 and actuated by member 115 and pusher 114 in the manner described above.

Finally, it will be noted from FIG. 4 that the member 115 and the pusher 114 have central bores 115a and 114a, respectively, therein. These last mentioned bores permit the provision of ejector means (not shown) to aid in the removal of tools or workpieces located within sleeve 82.

FIGS. 6 and 7 illustrate another embodiment of the present invention in the form of a chuck. In this instance the chuck has a body 124 which may be affixed to a suitable fixture or spindle 125 by a series of cap screws 126 or the like. The body 124 has an axial bore 127. The forwardmost portion of the bore 127 is of enlarged diameter as at 127a. Within the bore 127 there is located a thin-walled sleeve 128. The forwardmost portion of the sleeve 128 has an annular flange 128a receivable within the portion 127a of the axial bore in the chuck body. The sleeve may be held in position by any suitable means such as cap screws or the like passing through its flange 128a into the chuck body 124, or by a frictional fit or the like. The sleeve 128 has a pair of annular notches 129 and 130 containing O-rings 131 and 132, respectively. These assure a sealed fit between the sleeve and the axial bore 127 in the chuck body. The sleeve also has an elongated depression 133 equivalent to the depression 87 in sleeve 82 of FIG. 4.

As in the case of the previous embodiments, the chuck of FIGS. 6 and 7 may be provided with one or more actuator means. To this end, FIG. 7 illustrates two radial bores 134 and 135 in the chuck body connected respectively by passages 136 and 137 to the annular depression 133 in the sleeve. The bores 134 and 135 contain actuator means generally indicated at 138 and 139, respectively. The actuator means 138 and 139 need not be further described, being substantially identical to the actuator means taught with respect to the embodiments of FIGS. 1 through 5.

The chuck body 124 has a longitudinal bore 140 therein. A fitting 141 is threadedly engaged in the bore 140 and is sealed with respect thereto by means of O-rings located in annular notches 142 and 143 in the fitting 141.

The fitting 141 has an axial perforation 144 therein having a first portion 144a of small diameter, a second portion 144b of intermediate diameter, and a third portion 144c of large diameter. Within the perforation 144 there is an indicator pin 145 having portions 145a, 145b and 145c of diameters substantially equivalent to bore portions 144a, 144b and 144c, respectively. The portions 145b and 145c have annular notches 146 and 147 therein adapted to contain O-rings so as to have a sealing engagement with the portions 144b and 144c of bore 144. Finally, the rearward portion of bore 140 contains a spring means generally indicated at 148 which, again, may be of any suitable type. The spring means 148 are selected such that the forwardmost end of indicator pin 145 will be flush with the forward surface of fitting 141 when the closed hydraulic system and the sleeve 128 are properly pressurized. To accomplish this, a passage 149 in the chuck body 124 and a coaxial passage 150 in the fitting 141 are provided, communicating between the annular depression 133 in the sleeve and an annular chamber 151 formed between the indicator pin 145 and the bore 144. Thus, as pressure is built up in the closed system, pressure is likewise built up in annular chamber 151 tending to move the indicator pin 145 rearwardly of the chuck body against the action of spring means 148 until proper pressure exists in the closed system and the pin 145 is flush with the forward surface of fitting 141.

The use of the embodiment of FIGS. 6 and 7 is substantially the same as that described with respect to the embodiment of FIGS. 4 and 5. The primary difference lies in the manner in which pressure in the closed system is reduced to enable the insertion or removal of a tool or workpiece from the sleeve 128. To this end, a plug 152 is located within the axial bore 127 of the chuck body and is affixed to the chuck body by means of cap screws or the like, one of which is shown at 153. The fitting 152 has a pair of annular grooves 154 and 155 therein adapted to contain O-rings so that the fitting has a sealed relationship to the axial bore 127 in the chuck body 124.

The fitting 152 also has an axial bore 156 having a first portion 156a of larger diameter and a second portion 156b of lesser diameter. Slidably mounted within the bore portion 156a there is a piston 157 having a piston rod 158. The piston 157 has an annular groove 159 containing an O-ring so that the piston has a sealed engagement with the surface of wall portion 156a. Similarly, the piston rod 158 has an annular groove 160 containing an O-ring so that it has a sealing engagement with bore portion 156b.

The exterior surface of plug or fitting 152 is threaded and has a rearwardly extending tube 161 threadedly engaged thereon. The rearwardmost end of tube 161 is internally threaded and is closed by a plug 162 threadedly engaged therein. The plug 162 has an axial bore 163 through which the piston rod 158 extends.

The tube 161 serves as a housing means for the spring means located in the annular space formed between the tube 161 and the piston rod 158. The spring means are generally indicated at 164 and again may take any suitable form. The spring means 164 are in abutting relationship with the rearwardmost surface of fitting 152 and the forwardmost surface of a disc-like retainer 165 threadedly engaged on piston rod 158.

Finally, the chuck body 124 has a longitudinally extending passage 166 communicating between the passage 149 and a passage 167 in the fitting 152 to the bore portion 156a in that fitting. It will be understood that if a pushing force (again of any suitable type including mechanical, hydraulic, compressed air or the like) is applied to the end of the piston rod 158 in the direction of arrow A, an annular chamber 168 will be formed within the bore portion 156a of fitting 152 relieving the pressure in the closed hydraulic system. Thus, a force in the direction of arrow A on piston rod 158 will cause relaxation of the sleeve 128 permitting a tool or workpiece to be inserted therein or removed therefrom. Removal of the pushing force on piston rod 158 will cause the hydraulic system and the sleeve to return to their normal pressurized condition. The adequacy of the pressurization can at all times be determined by means of indicator pin 145. It will be understood that a fill port (not shown) for the hydraulic system will be located at some convenient position within the chuck body 124.

FIGS. 8 and 9 show yet another embodiment of the present invention, again in the form of a chuck. The chuck comprises a body 169 having a flange or adapter 170 appropriately affixed thereto. The chuck body has an axial bore 171 therein with a shoulder 172. A thin-walled sleeve 173 is located and appropriately held in the axial bore 171 with the rearwardmost end of the sleeve 173 abutting the shoulder 172. The sleeve 173, as in the previous embodiments of FIGS. 4 through 7, has a pair of annular grooves 174 and 175 containing O-rings 176 and 177, respectively. This assures a sealing fit between the sleeve 173 and axial bore 171. Again, the sleeve 173 has an annular, elongated depression 178 constituting a part of the closed hydraulic system.

The chuck body 169 has a longitudinal bore 179 therein similar to the bore 140 of FIG. 6. The bore 179 has a fitting 180 therein provided with annular grooves 181 and 182 containing O-rings so that the fitting 180 has a sealing fit with the bore 179. The fitting 180, itself, has a central bore 183 adapted to receive an indictor pin 184. The bore 183 has an annular groove 185 with an O-ring and the indicator pin 184 has an annular groove 186 with an O-ring so that the indicator pin 184 has a sealed fit within the bore 183. The entire assembly thus far described within the bore 179 in the body is held in place by a plug 187 threadedly engaged within the forward portion of the bore 179 and having its lowermost surface flush with the forward surface of the chuck body 169. The plug 187 has a central perforation 188 therein adapted to slidingly receive the forwardmost end of indicator pin 184. Finally, the rearwardmost portion of the bore 179 has therein a spring means generally indicated at 189. The spring means 189 is equivalent, for example, to the spring means 148 of FIG. 6 and may be of any appropriate type. The spring means 189 is preferably so chosen that when proper pressurization of the closed hydraulic system and sleeve 173 is achieved, the forwardmost end of indicator pin 184 will be flush with the forward surfaces of plug 187 and chuck body 169.

It will be noted from FIG. 8 that the chuck body 169 is provided with a passage 190 communicating between the annular depression 178 in the sleeve 173 and an annular depression 191 in the exterior surface of fitting 180. The fitting 180, in turn, has a passage 192 communicating between its annular depression 191 and a chamber 193 formed between its axial bore 183 and the indicator pin 184. Thus, when the closed hydraulic system is pressurized, hydraulic fluid under pressure will, by virtue of passage 190, annular depression 191 and passage 192, exist in chamber 193 tending to move the indicator pin 194 rearwardly of of the chuck body 169 against the action of the spring means 189. The annular depression 191 is provided so that alignment problems between passages 190 and 192 may be eliminated.

Turning to FIG. 9, it will be noted that the chuck body 169 may be provided with a pair of parallel transverse bores 194 and 195. These transverse bores may contain actuator means (not shown) of the type described with respect to the previous embodiments. As shown in FIG. 9, the bore 194 may be connected by passage 196 both to the annular depression 178 in the sleeve and the annular depression 191 in fitting 180 (see also FIG. 8). The passage 195 may also continue to the exterior of the chuck body 169, terminating in a fill port 197. In similar fashion, the bore 195 may be connected by passage 198 to the annular depression 191 in fitting 180. Again the passage 198 may continue to the exterior of the body 169 of the chuck, terminating in a fill port 199.

The use of the structure of FIGS. 8 and 9 thus far described, is substantially the same as that described with respect to the structures of FIGS. 6 and 7. It will be understood that the sleeve 173 will be in its pressurized, tool or workpiece-engaging configuration (both in the presence or absence of a tool or workpiece) at all times and that the adequacy of this pressurization may be determined from the position of indicator pin 184.

Again, to insert or remove a tool or workpiece from sleeve 173, it is necessary to decrease the pressure of the closed hydraulic system. To this end, the rearward portion of chuck body 169 has a longitudinal bore 200 connected to the annular depression 178 in the sleeve 173 by passage 201. The bore 200 is closed by plug means 202 having an axial perforation 203 therein. The bore 200 contains a piston 204 having a piston rod 205 slidably mounted in and extending beyond the perforation 203 in plug 202. The piston 204 has an annular notch 206 with an O-ring therein so that it is sealed with respect to the interior surface of bore 200.

It will be understood from the above description that should the piston 204 move rearwardly with respect to the chuck body 169 (i.e., to the left in FIG. 8), the volume of that portion of bore 200 ahead of the piston will be increased and the pressure within the closed hydraulic system will be decreased, enabling a tool or workpiece to be inserted into or removed from the sleeve 173.

FIG. 8 also illustrates means to permit the rearward movement of piston 204 and to return it to its normal position shown. The means comprises a push rod 207 slidably mounted in a bushing 208 and connected at its rearwardmost end to a piston 209. The piston is slidably supported in a bore 210 in a cylinder housing 211 and a bore 212 in a cylinder cover 213. The cylinder cover is affixed to the cylinder housing by a plurality of cap screws or the like, one of which is shown at 214.

The cylinder 209 has an annular groove 215, containing an O-ring, and forming a seal within the bore 210 in the cylinder housing 211. Similarly, the cylinder 209 has another annular groove 216, containing an O-ring and forming a seal within the bore 212 of cylinder cover 213.

The piston 209 has an annular flange 217 also having an annular groove 218 containing sealing means to seal against the inside surface of cylinder housing 211. An appropriate spring means (generally indicated at 219) operates between an interior surface of the cylinder cover and the flange 217 of piston 209 tending to urge the piston 209, push rod 207 and piston 204 to their normal position as shown in FIG. 8.

The rearwardmost end of cylinder cover 213 has a threaded bore 220 therein, to receive a connection (not shown) to a source of compressed air, hydraulic fluid or the like. The piston 209 has an axial bore 221 terminating in a passage 222 leading to a chamber 223 formed between the forwardmost surface of flange 217 and a rearward surface of the cylinder housing. It will be understood that the introduction of compressed air or hydraulic fluid through the perforation 220 in the cylinder cover will cause the air or hydraulic fluid to pass through the bore 221 in the piston 209 and the passage 222 to the chamber 223. This in turn will cause the rearward movement of piston 209 and push rod 207 against the action of spring means 219. The piston 204 in the chuck body 169 will follow by virtue of the fact that the closed hydraulic system in the chuck body is pressurized.

FIGS. 10 and 11 show yet another embodiment of the present invention, again in the form of a chuck. In this instance, however, the chuck is totally self-contained, including the means for releasing the pressure in the hydraulic system and on the thin-walled sleeve.

The chuck of FIGS. 10 and 11 comprises a body generally indicated at 224 and having a forward portion 224a and a rearward portion 224b. The rearward portion 224b is adapted to be affixed to a suitable spindle or fixture 225 by means of a plurality of cap screws 226 passing through coaxial perforations in the body portions 224a and 224b and the fixture or spindle 225. The body portions 224a and b, themselves, are joined together by additional cap screws 227 so that the chuck can be removed from the fixture or spindle as a unit.

The body portion 224a has a rearward cylindrical extension 224c and the body portion 224a and its rearward extension have an axial bore 228 therein. This axial bore is closed at its rearward end by body portion 224b. The axial bore is adapted to receive a thin-walled sleeve 229 held therein frictionally, or by any other suitable means. The sleeve 229 has a pair of spaced annular grooves 230 and 231 containing O-rings 232 and 233, respectively, so that the sleeve is sealed with respect to the inside surface of axial bore 228. The sleeve also has an elongated annular depression 234 constituting a part of the closed hydraulic system. The thin wall portion of sleeve 229 may have a portion 235 of increased thickness to assure proper distortion of the sleeve into its gripping configuration when the closed hydraulic system is pressurized.

Turning to FIG. 11, it will be noted that the body portion 224a of the chuck has a transverse bore 236 containing actuator means, generally indicated at 237. The actuator means 237 may be substantially identical to the actuator means described with respect to the previous embodiments, and need not be further described.

The transverse bore 236 is connected by means of a passage 238 to the annular depression 234 in the sleeve 229. The passage 238 may continue to the exterior surface of the body portion 224a terminating in a fill port 239 provided with a closure plug 240. An additional radial passage 241 extends from the annular depression 234 in the sleeve 229 to the exterior of the body portion 224a and also terminates in a fill port 242 provided with a closure plug 243. It will be noted that the passage 241 (see FIG. 11) communicates with an indicator pin 244 and its attendant structure, located in a longitudinal bore 245 in the body portion 224a. The indicator pin 244 and its assembly may be identical to that described with respect to FIGS. 6 or 8, and need not be further described.

It will be noted that the radial passage 238 extending from the annular depression 234 in the sleeve 229 to the exterior of the body portion 224a also communicates with a longitudinal bore 245 in the body portion 224a. The bore 225 contains a floating piston 246 therein. The piston 246 has an annular notch 247 containing an O-ring so as to be sealed with respect to the bore 245.

The body portion 224b is hollow and forms an annular chamber 248 about the rearward extension 224c of body portion 224a. Located within this annular chamber there is an annular plate 249 slidably mounted about the rearward extension 224c. The plate 249 has annular grooves 250 and 251 in its edges provided with sealing means so that the plate is sealed with respect to the inside surface of body portion 224b and the extended portion 224c of body portion 224a.

The floating piston 246 in bore 245 rests upon the upper surface of plate 249. The bottom surface of plate 249, beneath piston 246, has a downwardly depending plug or extension 252 surrounded by a spring means generally indicated at 253. The spring means extends between the lower surface of plate 249 and the facing interior surface of body portion 224b. Again the nature of the spring means does not constitute a limitation on the present invention. The spring means 253 are chosen such that when the closed hydraulic system of the chuck and the sleeve 229 are properly pressurized, the piston 246 and plate 249 will remain in the position shown in FIG. 10.

The rearward extension 224c of body portion 224a has a passage 254 therein communicating with that part of annular chamber 248 above plate 249. The body portion 224b has a passage 255 therein communicating at one end with passage 254 and at the other end with an axial bore 256 configured to have the end of a compressed air conduit 257 threadedly engaged therein.

In FIG. 11 the annular plate 249 is shown in dotted lines, as are piston 246, plug 252 and spring means 253. Two other substantially identical piston, plug and spring assemblies are located evenly about annular plate 249 and are designated generally at 258 and 259. The piston of assembly 258 is in communication with the closed hydraulic system by virtue of passage 260 extending from the annular depression 234 in sleeve 229 to the exterior of body portion 224a wherein it terminates in a fill port 261 provided with a closure plug 262. The piston of assembly 259 is similarly connected by means of a radial passage 263 terminating in a fill port 264 having a closure plug 265.

The operation of the closed hydraulic system, the sleeve 229 and the indicator pin 244 is substantially the same as that described with respect to the embodiments of FIGS. 6 and 8. To relieve the pressure in the closed hydraulic system and to cause the sleeve 229 to assume its release configuration so that a tool or workpiece may be inserted into it or removed from it, air pressure is introduced to the structure by means of conduit 257. As will be evident from FIG. 10, air under pressure will pass through passages 255 and 254 into that portion of annular chamber 248 above the annular plate 249. This will cause the plate to move downwardly in FIG. 10 against the action of spring means 253 as well as the action of the springs in association with assemblies 258 and 259 (see FIG. 11). Since the hydraulic system is under pressure, floating piston 246 will tend to follow the plate 249 thus increasing the volume of bore 245 above piston 246. The same will happen with respect to the floating pistons of assemblies 258 and 259. As a result, the pressure within the hydraulic system and upon sleeve 229 will be released.

Once a tool has been inserted into or removed from sleeve 229, the introduction of air under pressure via conduit 257 may be terminated with the result that annular plate 249 will return to the position shown in FIG. 10 under the influence of spring means 253 and the similar spring means in association with assemblies 258 and 259. This, in turn, will cause the floating piston 246 and the similar floating pistons in association with assemblies 258 and 259 to return to their normal position with the result that the closed hydraulic system will again be properly pressurized, as will be sleeve 229. Proper pressurization can readily be determined by the operator by means of indicator pin 244. It will be understood by one skilled in the art that the embodiment of FIGS. 10 and 11 could be actuated by hydraulic fluid rather than compressed air.

Modifications may be made in the invention without departing from the spirit of it.

The embodiments of the invention in which an exclusive property or privilege is claimed are defined as follows:

1. A hydraulically controlled holding device for accurately locating and securely locking work pieces in position during the performance of various operations thereon, said holding device comprising a body and a thin-walled sleeve supported thereby, a closed hydraulic system within said body and in direct communication with said sleeve, means to pressurize said closed hydraulic system to a desired value whereby to uniformly distort said sleeve to a workpiece gripping position, at least two pressure releasing means shiftable between a first position wherein said desired pressure in said closed hydraulic system is maintained and said sleeve is in said gripping position and a second position wherein said pressure in said closed hydraulic system is relieved and said sleeve is relaxed to a workpiece releasing position, each of said pressure releasing means comprising a piston in a cylinder, each of said cylinders being connected to said closed hydraulic system, said pistons when in said second position being so located within their respective cylinders as to permit the bleeding of hydraulic fluid from a said closed hydraulic system into said cylinders to relieve said desired pressure in said system, said pistons when in said first position expelling said hydraulic fluid from their respective cylinders to maintain said desired pressure in said closed hydraulic system, resilient means to urge said pistons toward said first position and to normally retain them in said first position, said pistons being shiftable from said first position to said second position against the action of said resilient means by an outside force independent of said closed hydraulic system, whereby said sleeve is normally in said gripping position unless said pistons are acted upon by said outside force whereupon said sleeve is relaxed to said releasing position to return to said gripping position upon deactivation of said outside force, said pistons being in abutting relationship with a common element, said resilient means acting upon said common element, means to transmit said outside force to said common element permitting said pistons to shift to said second position, and a plurality of rod-like indicator means giving a visual indication of the pressure in said closed hydraulic system, said rod-like indicator means being evenly spaced along and affixed to said common element, each of said indicator means being slidably mounted in a perforation extending through the exterior surface of said body, the extent to which said indicators extend beyond said exterior surface comprising said visual indication, said indicators comprising said means for transmitting said outside force to said common element.

2. The structure claimed in claim 1 wherein said holding device is an arbor.

3. The structure claimed in claim 1 including at least three of said pressure releaving means.

* * * * *